United States Patent [19]
Wiese

[11] Patent Number: 6,108,707
[45] Date of Patent: Aug. 22, 2000

[54] ENHANCED FILE TRANSFER OPERATIONS IN A COMPUTER SYSTEM

[75] Inventor: Michael L. Wiese, Los Altos Hills, Calif.

[73] Assignee: Apple Computer, Inc., Cupertino, Calif.

[21] Appl. No.: 09/074,546

[22] Filed: May 8, 1998

[51] Int. Cl.[7] .................................................. G06F 13/00
[52] U.S. Cl. .................. 709/231; 709/232; 709/213; 709/102; 709/103; 710/52
[58] Field of Search .................................. 709/231, 213, 709/102, 103, 104, 232; 710/52

[56] References Cited

U.S. PATENT DOCUMENTS

| | | | |
|---|---|---|---|
| 4,713,758 | 12/1987 | De Kelaita et al. ..................... | 714/32 |
| 5,125,096 | 6/1992 | Brantley, Jr. et al. .................. | 712/1 |
| 5,386,552 | 1/1995 | Garney ................................... | 714/10 |
| 5,450,547 | 9/1995 | Nguyen et al. ......................... | 395/250 |
| 5,577,172 | 11/1996 | Vatland et al. ......................... | 358/1.15 |
| 5,586,093 | 12/1996 | Honda et al. ........................... | 369/32 |
| 5,594,926 | 1/1997 | Chang et al. ........................... | 710/52 |
| 5,777,755 | 7/1998 | Aoki et al. .............................. | 358/444 |
| 5,787,243 | 7/1998 | Stiffler ................................... | 714/13 |
| 5,805,920 | 9/1998 | Sprenkle et al. ....................... | 710/1 |
| 5,845,074 | 12/1998 | Kobota ................................... | 709/219 |

*Primary Examiner*—Glenton B. Burgess
*Assistant Examiner*—Abdullahi E. Salad
*Attorney, Agent, or Firm*—Burns, Doane, Swecker & Mathis, L.L.P.

[57] ABSTRACT

In a general computer system or computer network, the ability to transfer (i.e., copy and/or move) files from a source location to a destination location within the computer system or computer network can be accomplished more efficiently by employing a file transfer operation that includes a read and write processes which can be executed concurrently or in parallel as two distinct and independent processes. The file transfer operation can be made even more efficient by transferring the file information in relatively large data blocks called "chunks", rather than one file at a time. Finally, the computer system's ability to respond to user initiated tasks during the execution of a file transfer operation is enhanced by employing a cooperative task scheduling technique, wherein a file transfer operation shares the computer system's resources (e.g., the CPU) with other concurrent user initiated operations.

44 Claims, 2 Drawing Sheets

ENHANCED FILE TRANSFER OPERATIONS IN A COMPUTER SYSTEM

BACKGROUND OF THE INVENTION

1. Field of the Invention

The present invention relates to general computer systems and/or computer networks. More particularly, the present invention relates to a method for efficiently transferring files from a source location to a destination location within a general computer system and/or computer network.

2. Description of Related Art

In a typical computer system, the task of transferring one or more files generally involves two closely coordinated processes: a read process and a write process. For example, if a user wishes to transfer a file A and a file B from a source location to a destination location, the computer system, through the read process, reads the first file (e.g., file A) from the source location to a memory buffer. Once the first file is stored in the buffer, the computer system, through the write process, writes the first file from the memory buffer to the desired destination location. When the write process completes this task, the computer system repeats the operation for the second file (i.e., file B). For the purpose of the present discussion, it will be understood that a file transfer operation involves copying or moving a file from a source location to a destination location.

Traditionally, file transfer operations are given a high priority by the computer system, such that once a file transfer operation has been initiated, the user is prevented from interacting with the computer system until the file transfer operation is complete. That is because the computer system's CPU is dedicated to completing the file transfer operation and is, therefore, unavailable to handle concurrent user initiated operations. In many computer systems, the fact that the CPU is temporarily unavailable to handle concurrent user initiated operations is indicated by an "hourglass" icon on the computer system's display.

There are numerous disadvantages to the way in which computer systems traditionally transfer files. For example, transferring individual files one file at a time, as described above, from a source location to a buffer and then to a destination location may take an excessively long period of time to complete, particularly when the operation involves hundreds of files. Moreover, the computer system's ability to complete the operation may be further impacted if the access speed of the source and destination media differ, thereby causing either the read process or the write process to slow down the progress of the other.

Another disadvantage associated with transferring files, as described above, relates to the fact that the computer system must attach a header to each file being transferred. Attaching a header to each file, as one skilled in the art will appreciate, increases the amount of overhead that must be transferred along with the file information. As the number of files to be transferred increases, and as the average size of each file decreases, the ratio of overhead to file data increases proportionally. This also has the effect of slowing down a file transfer operation.

Yet another disadvantage relates to the fact that traditionally, file transfer operations are granted a high priority by the computer system, such that the user is precluded from interacting with the computer system until after the completion of the file transfer operation. This may be especially problematic if the file transfer operation takes a relatively long period of time to complete.

SUMMARY

The present invention involves a technique for transferring file information within a general computer system and/or computer network, wherein the read and write processes are executed in parallel, or in sequence, as two distinct and independent processes. Moreover, file information is transferred in relatively large data structures called "chunks", rather than one file at a time. Finally, the present invention involves a "cooperative" task scheduling technique, wherein a file transfer operation shares the computer system's resources (e.g., the computer system's CPU) with other, concurrent user initiated operations (e.g., opening and closing window operations and mouse/keyboard operations).

Accordingly, it is an object of the present invention to provide better file transfer performance by preventing the read process or the write process from adversely affecting the progress of the other.

It is another object of the present invention to provide better overall file transfer performance by reducing the amount of overhead required to complete the file transfer operation.

It is another object of the present invention to provide better overall file transfer performance by reducing the number of independent transactions required to complete a file transfer operation.

It is still another object of the present invention to improve the computer system's ability to respond to user initiated operations without compromising file transfer performance.

In accordance with one aspect of the present invention, these and other objects are achieved by a method, apparatus and/or computer program for accomplishing a cooperative file transfer operation. The method, apparatus and/or computer program involves transferring a file from a source location to a buffer, and then transferring the file from the buffer to a destination location. During the file transfer process, a determination is made as to whether a task has initiated. If it is determined that a task has been initiated, the file transfer operation is suspended, and a computer resource is yielded to accomplish the user initiated task. Eventually, the computer resource is yielded back to the file transfer operation, and the file transfer operation is resumed.

In accordance with another aspect of the present invention, these and other objects are achieved by a method and/or personal computer system executing a program for cooperatively transferring a plurality of files from a source location to a destination location. The method and/or program involves the step of transferring the plurality of files as a single, continuous stream of data from the source location to the destination location via a buffer in the personal computer system. Then, during the step of transferring the plurality of files, a determination is made as to whether the user has interacted with the personal computer system. If it is determined that the user has interacted with the personal computer system, the step of transferring the plurality of files is suspended, and the central processing unit in the personal computer system is yielded to the task associated with the user interaction. Eventually, the central processing unit is yielded back in order to resume transferring the files.

BRIEF DESCRIPTION OF THE DRAWINGS

In the text which follows, the invention is explained with reference to illustrative embodiments, in which.

DETAILED DESCRIPTION OF THE INVENTION

Figure 1:
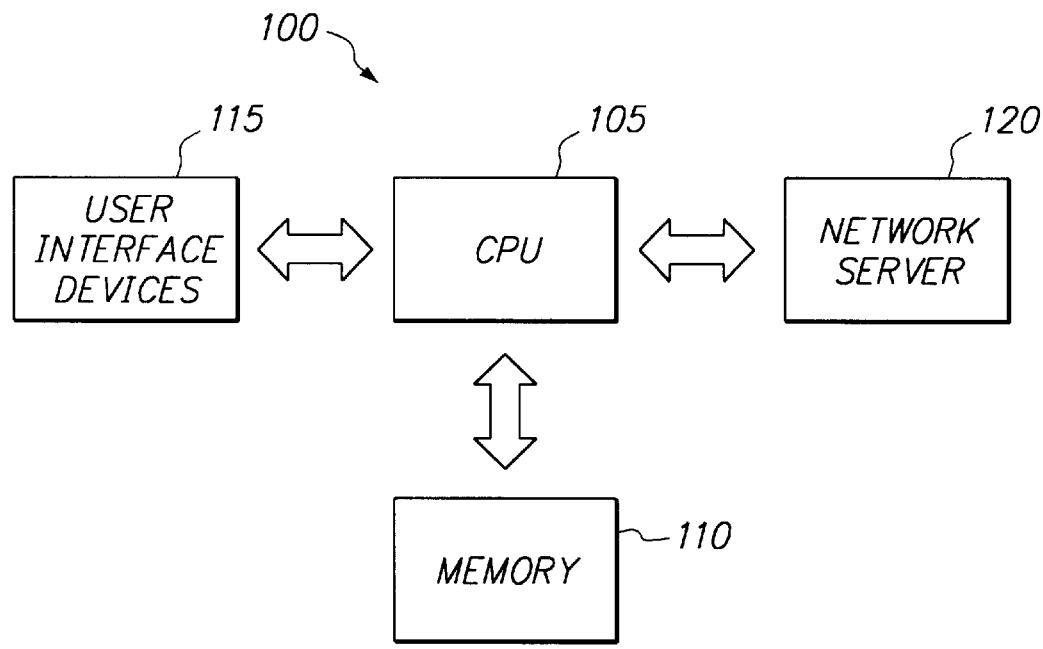
FIG. 1 illustrates a general computer system in accordance with the prior art.

For a better understanding of the present invention, reference is made to the following detailed description taken in conjunction with the accompanying drawings, wherein exemplary embodiments of the present invention are illustrated and described. It should be noted that the reference numbers appearing in the drawings are used consistently throughout each of the drawings.

FIG. 1 illustrates a general or personal computer system 100 as is well known in the art. The computer system 100 includes, among numerous other features, a central processing unit (CPU) 105, which essentially controls the operation of the computer system 100. The computer system 100 also includes a memory unit 110. It will be understood that the computer system 100 actually employs different types of memory. However, for the purpose of the present invention, the memory unit 110 represents a random access memory (RAM). Typically, the computer system 100 includes several user interface devices 115, such as a monitor and a keyboard. While the computer system 100 operates as a stand-alone unit, it is relatively common for the computer system 100 to be a part of a larger computer network. Generally, the computer system 100 interfaces to the network through a network server, for example, network server 120.

More specifically, the present invention involves file transfer operations with a computer system, such as the computer system 100 illustrated in FIG. 1. As stated above, a file transfer operation may involve a file copy operation or a file move operation. Moreover, it will be understood that various aspects of the present invention described herein below are to be implemented in software, using standard software programming techniques, and that the software is stored in memory associated with or internal to the computer system.

In accordance with a first aspect of the present invention, file transfer "streaming" is provided, wherein the file transfer operation involves at least two distinctly independent processes: a read process and a write process. While it is possible, if not probable, that these two independent processes are executed in parallel (i.e., concurrently), it is not required that the two processes be executed in parallel.

Figure 2:
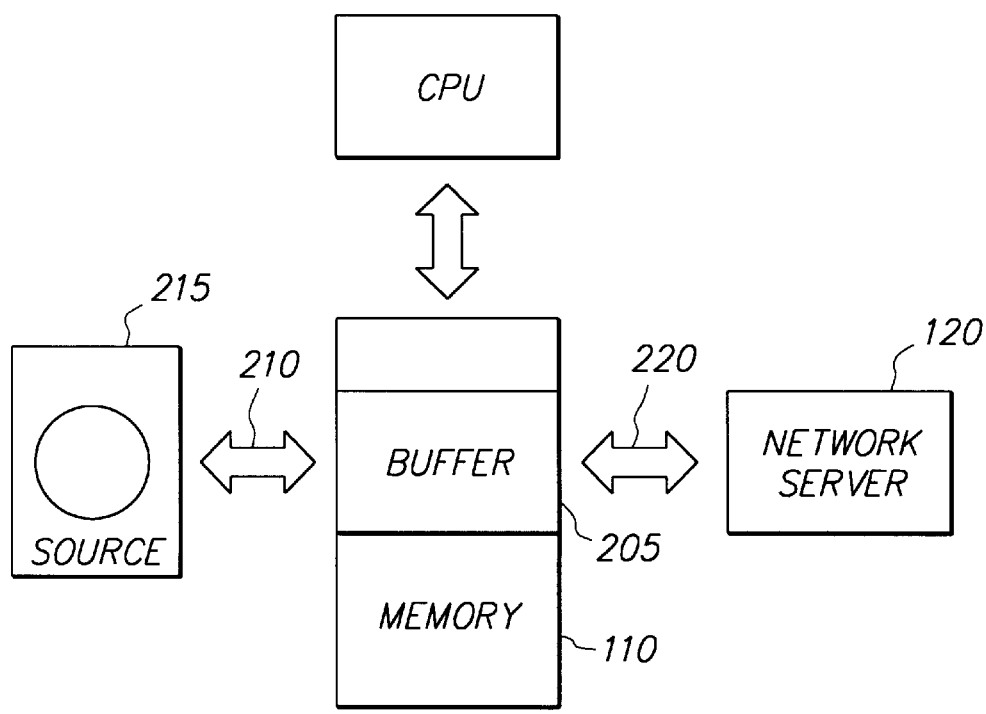
FIG. 2 illustrates a first aspect of the present invention, wherein a file transfer operation employs separate and independent read/write processes.

FIG. 2 assists in illustrating this file transfer streaming technique in accordance with a preferred embodiment of the present invention. As shown in FIG. 2, a certain amount of the RAM 110 is predesignated (i.e., set aside) to serve as a buffer 205 during file transfer operations. Upon a user initiated request to transfer one or more files from a source location to a destination location, the present invention invokes the file transfer operation. This, in turn, involves the invocation of the read process, represented by arrow 210 in FIG. 2. The read process 210 proceeds by reading the one or more files to be transferred from the source location 215, which may be, for example, a hard disk internal to the computer system 100. After reading the one or more files from the source location 215, the read process 210 stores the one or more files in the buffer 205. Once file information is stored in the buffer 205, whether or not the read process 210 has completed the task, the write process may be invoked, wherein the write process is represented by arrow 220 in FIG. 2. The write process 220 proceeds by writing the one or more files from the buffer 205 to the destination location, which may be, for example, a memory location in the network server 120.

This aspect of the present invention is unique with respect to prior file transfer techniques in that it involves independent read and write processes, as explained above. The primary advantage provided by independent read and write processes is that it reduces the likelihood that one process, due to the access speed of the source or destination media, will adversely impact the other process. Consequently, the efficiency of the file transfer operation is enhanced.

Another advantage associated with independent read and write processes is it supports the ability to archive the one or more files to be transferred. In general, archiving involves reading the one or more files from the source location 215, as illustrated in FIG. 2, storing them in the buffer 205, and then transferring them to an intermediate location. Here, the write process 220 is not immediately invoked upon storing the file information in the buffer 205. The file information may now remain in the intermediate location for some period of time. Then, at a later time, for example, after the computer system 100 has completed some other tasks, the file information is transferred back to the buffer 205, and the write process 220 unarchives the one or more files. That is, the write process 220 proceeds with transferring the one or more files from the buffer 205 to the intended destination location.

While the read process 210 operates independent of the write process 220, and the write process operates independent of the read process 210, there is a certain level of coordination between the two. In a preferred embodiment of the present invention, the CPU delegates the task of coordinating (i.e., arbitrating) the execution of the read and write processes 210 and 220 to the buffer 205. For example, if the read process 210 fills the buffer 205 with file information, for example, before the write process 220 is invoked, the buffer 205 can suspend the read process 210 until the write process 220 transfers enough file information from the buffer 205 to the destination location, thereby creating additional space in the buffer 205 for the read process 210 to resume operations.

In accordance with another aspect of the present invention, the file information is transferred as a continuous stream of data via one or more data blocks herein referred to as "chunks". The size of a chunk is relatively large in comparison to the average size of a file. Accordingly, each chunk typically contains multiple files, or portions thereof. Determining the optimum chunk size is discussed in greater detail below.

Figure 3:
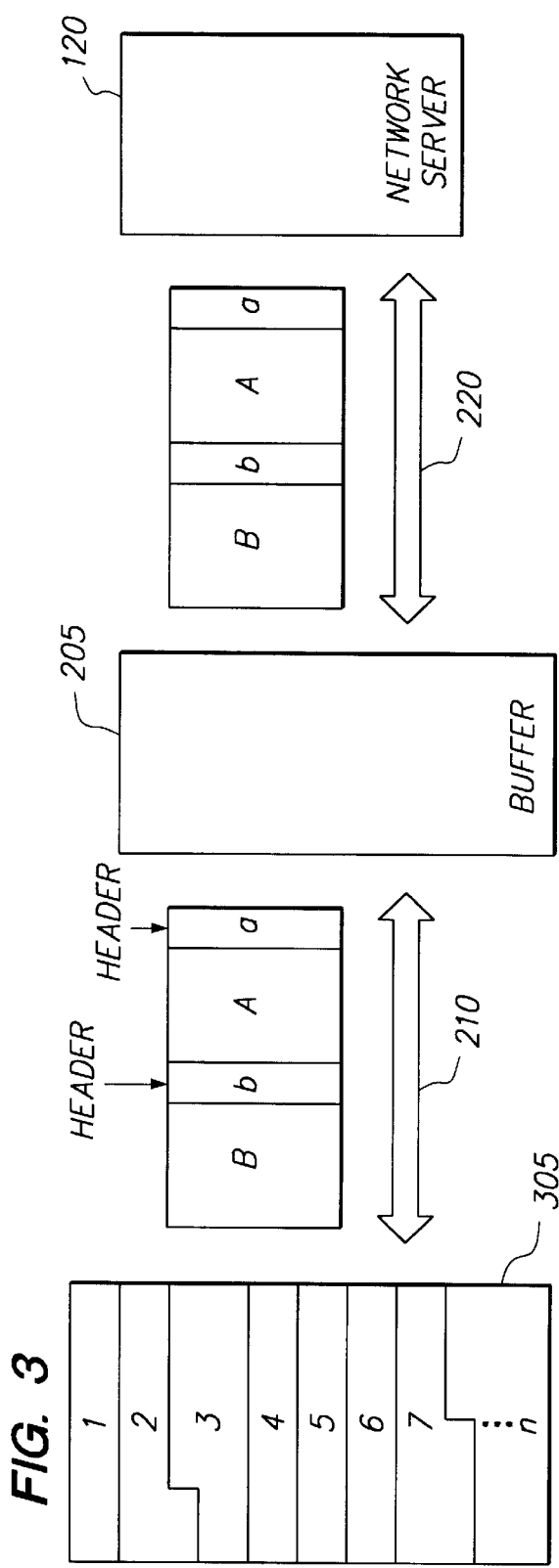
FIG. 3 illustrates a second aspect of the present invention, wherein file information is transferred in a continuous stream of data, rather than one file at a time.

FIG. 3 illustrates this aspect of the present invention, wherein file information is transferred as a continuous stream of data 305 from a source location to a destination location in chunks, rather than one file at a time. As shown in FIG. 3, the continuous stream of data 305 includes a number of files 1 . . . n which are to be transferred to a destination location in, for example, the network server 120. In accordance with this aspect of the present invention, the continuous stream of file data (i.e., files 1 . . . n) is organized into one or more chunks, for example, chunks A and B. It should be noted that each chunk includes some overhead information represented by header a and header b, wherein the overhead information is primarily used by the computer system 100 for identifying, among other things, the file information contained in each chunk. It should be noted that chunk A includes a small amount of overhead a, while chunk B includes a small amount of overhead b, as shown in FIG. 3. This overhead is used to delineate the boundaries between the chunks. The read process 210 then transfers chunks A and B into the buffer 205. In parallel with, or subsequent to, storing chunks A and B in the buffer 205, the write process 220 transfers chunk A and chunk B to the network server 120.

There are a number of advantages associated with transferring multiple files as a continuous stream of data as described above. The primary advantage, however, is that the number of transactions required to accomplish the multiple file transfer operation is significantly reduced. This, in turn, reduces the transfer time (i.e., the amount of time required to complete the multiple file transfer operation). Other advantages associated with this aspect of the present invention include facilitating the use of data compression and encryption techniques.

For example, in accordance with prior techniques, where the various files are to be transferred one file at a time, the computer system 100 must execute a number of steps for each individual file (e.g., opening the file, closing the file, creating a destination file, setting attributes), in addition to transferring the file data itself. Furthermore, each step typically involves two separate transactions. Moreover, each step takes time, and they must be accomplished in order. That is, one step cannot be started until the previous step has been completed. In accordance with the present invention, however, only a single set of transactions is required, as the file information is being transferred as one continuous stream of data. Reducing the number of transactions required to transfer the file information has the effect of reducing the transfer time. Accordingly, the present invention is capable of accomplishing a file transfer operation more efficiently.

Determining optimum chunk size is very important. For example, as chunk size increases, the extent to which the read process 210 and the write process 220 can be executed in parallel (i.e., the extent to which the read process 210 and the write process 220 can temporally overlap) decreases. Of course, this limits performance by increasing transfer time. On the other hand, as chunk size decreases, overhead percentage increases. This too limits performance by increasing transfer time. Thus, in order to minimize transfer time (i.e., maximize performance), optimum chunk size should be determined.

In accordance with a preferred embodiment of the present invention, the optimum chunk size may be determined as shown in equation (1) below:

$$C=(F*a*b)^{1/2} \quad (1)$$

where C represents chunk size in bytes; F represents the file size in bytes, a represents overhead in seconds, and b represents throughput of the system in bytes/second.

By way of example, assume the file size F is equal to 100 Megabytes, overhead a is equal to 1 millisecond, and the system throughput capacity is measured at 10 Megabytes/second. In accordance with equation (1) above, optimum chunk size is 1 Megabyte.

Equation (2) below can be used to prove that 1 Megabyte is, in fact, the optimum chunk size in the present case:

$$T=(F/C+1)*(C/b+a) \quad (2)$$

where T represents transfer time. If, in equation (2), the chunk size C is set equal to 1 Megabyte, transfer time T is equal to 10.201 seconds. If the chunk size is set equal to a value greater than 1 Megabyte, for example, 2 Megabytes, transfer time T increases to 10.251 seconds. Similarly, if the chunk size is set to a value that is less than 1 Megabyte, for example, 0.5 Megabytes, transfer time T again increases to 10.251 seconds. Accordingly, 1 Megabyte is the optimum chunk size in the present example, as it corresponds to the minimum transfer time.

In accordance with yet another aspect of the present invention, a "cooperative" task execution strategy is employed, wherein the file transfer operation "cooperates" with other tasks, particularly user initiated tasks, by yielding the computer system's resources, such as the CPU 105, to execute a task initiated during the file transfer operation. Accordingly, the file transfer operation can not prevent the user from interacting with the computer during the file transfer operation, as is the case with prior techniques. With respect to this aspect of the present invention, it will be understood that the phrase "initiated" refers to both originally initiated and/or re-initiated tasks.

Figure 4:
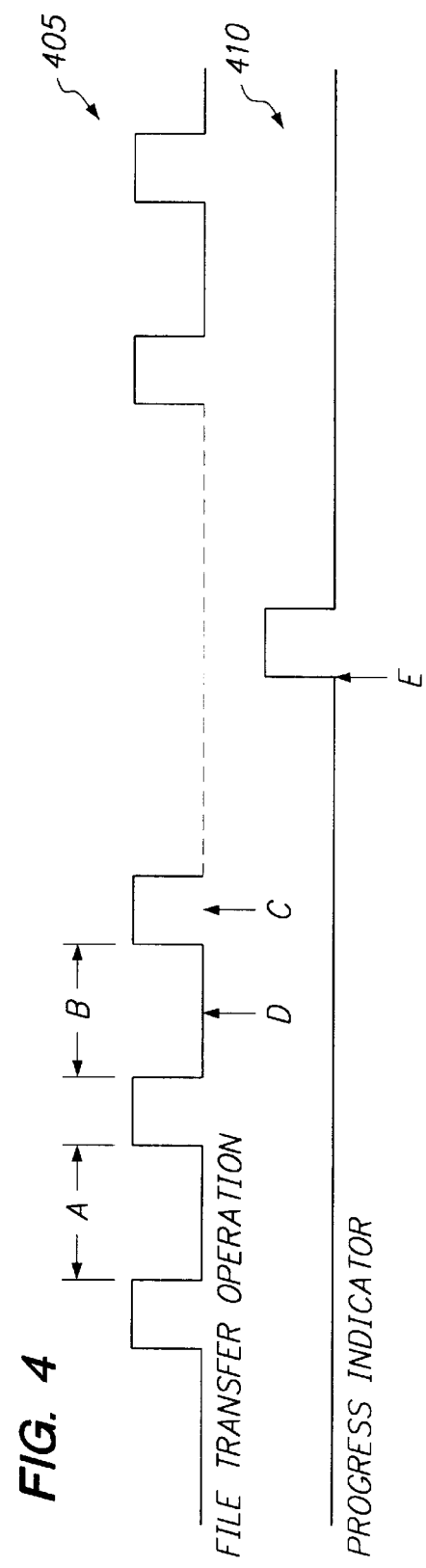
FIG. 4 illustrates a third aspect of the present invention, wherein a file transfer operation employs a cooperative task execution strategy that allows users to interact with the computer system during a file transfer operation.

In accordance with this aspect of the present invention, a file transfer operation proceeds as previously described, wherein file information is transferred, preferably in a continuous stream of data, to the buffer 205 by the read process 210. The file information is then transferred from the buffer 205 to the intended destination location by the write process 220. Referring now to FIG. 4, time intervals A and B along file transfer operation timeline 405 represent exemplary intervals during which file information is either being read to or written from the buffer 205. After each interval, for example, at point C along timeline 405, a determination is made as to whether the user has attempted to interact with the computer system 100, that is, whether the user has tried initiating a task through, for example, a mouse or keyboard operation (e.g., opening a window, moving a window, entering data through the keyboard, expanding a pull-down menu). If it is determined that the user has initiated such a task, the file transfer operation yields the CPU 105 to process the user initiated task.

In a preferred embodiment of the present invention, user interaction with the computer system 100 through a mouse or keyboard operation causes the system's mouse/keyboard interrupt handler to set a special status flag. For the purpose of illustration, a user initiated task which causes the interrupt handler to set the status flag occurs at point D along timeline 405. As explained above, a determination is made after each time interval, for example, time interval B, as to whether the user has initiated a task. This determination is accomplished by checking the state of the status flag. In the present case, the status flag has been set. Therefore, the file transfer operation yields the CPU 105 to the user initiated task.

In general, the file transfer operation yields the CPU 105 to the user initiated task until the user initiated task is completed. For example, if the user initiated task involves extending a pull-down menu, the file transfer operation is temporarily suspended while the CPU 105 causes the pull-sown menu to be expanded. Once the user initiated task is complete, the CPU 105 is turned back over to the file transfer operation. Again, for the purpose of illustration, the rising edge of the pulse at point E along the process monitor timeline 410 indicates that the task initiated by the user at point D is now complete. Accordingly, the file transfer operation resumes as shown. Furthermore, the file transfer operation proceeds until the file transfer operation is complete or until the user initiates another task.

It will be understood that some tasks are more complex than other tasks. Consequently, it takes longer to complete some tasks. For example, expanding a pull-down menu is a relatively simple task. In contrast, opening up a heavily populated window which represents a data structure stored, for example, on the network server 120, is far more complex. Accordingly, it may take a considerably longer period of time to complete this task. In accordance with a preferred embodiment of the present invention, during more complex user initiated tasks, where the CPU 105 may be required to wait for other devices to respond, such as the network server 120, the CPU 105 may be temporarily yielded back to the file transfer operation for a period of time.

It will also be understood that the user may initiate two or more concurrent tasks during a file transfer operation. If, in this case, the two or more concurrent user initiated tasks are relatively simple tasks, the CPU 105 is yielded to the first of these tasks until the task is completed. The CPU 105 is then yielded to the next user initiated task in sequence. This process continues until all of the user initiated tasks have been completed. The CPU 105 is then yielded back to the file transfer operation. However, if at least a few of the two or more concurrent user initiated tasks are of a more complex nature, where the CPU 105 may be forced to wait for other devices to respond, the CPU 105 is yielded from one user initiated task to the next in a kind of round-robin procedure. Again, once each of the user initiated tasks are completed, the CPU 105 is turned back over to the file transfer operation.

The primary advantage associated with this aspect of the present invention is that it provides an equitable trade-off between system performance (i.e., the computer system's ability to efficiently accomplish a file transfer operation) and system response (i.e., the computer system's ability to allow the user to interact with the system during a file transfer operation). More specifically, this aspect of the invention optimizes the computer system's ability to respond to user initiated tasks in a timely manner without compromising file transfer operation performance.

The various aspects of the present invention have been described with respect to a preferred embodiment. However, it will be readily apparent to those skilled in the art that it is possible to embody the invention other than as described above without departing from the spirit of the invention. The preferred embodiment is nevertheless illustrative and it should not be considered restrictive in any way. The scope of the invention is given by the appended claims, rather than the preceding description, and all variations and equivalents which fall within the range of the claims are intended to be embraced therein.

What is claimed is:

1. A method for accomplishing a cooperative file transfer operation comprising the steps of:

transferring a file from a source location to a buffer;

transferring the file from the buffer to a destination location;

determining whether a task has been initiated by a user during the file transfer operation;

suspending the file transfer operation if it is determined that a task has been initiated by a user;

yielding a computer resource to accomplish the task;

yielding the computer resource back to the file transfer operation; and resuming the file transfer operation.

2. The method of claim 1, wherein the file transfer operation is a copy file operation.

3. The method of claim 1, wherein the file transfer operation is a move file operation.

4. The method of claim 1, wherein said step of transferring the file from the source location to the buffer involves a read process, wherein said step of transferring the file from the buffer to the destination location involves a write process, and wherein the write process is executed independent of the read process.

5. The method of claim 4 further comprising the step of:

archiving the file in the buffer, wherein there is no temporal overlap between the read process and the write process.

6. The method of claim 4, wherein the read process and the write process are executed simultaneously.

7. The method of claim 1 wherein said step of determining whether a task has been initiated during the file transfer operation comprises the step of:

determining whether a status flag has been set in response to task initiation.

8. The method of claim 1, wherein said step of yielding the computer resource back to the file transfer operation comprises the step of:

determining whether the task is completed.

9. The method of claim 1, wherein said step of yielding the computer resource back to the file transfer operation comprises the step of:

determining whether the computer resource is required to wait during the task.

10. In a personal computer system, a method for cooperatively transferring a plurality of files from a source location to a destination location, said method comprising the steps of:

transferring the plurality of files as a single, continuous stream of data from the source location to the destination location via a buffer in the personal computer system;

during said step of transferring the plurality of files, determining whether a user has interacted with the personal computer system;

suspending said step of transferring the plurality of files, if it is determined that the user has interacted with the personal computer system;

yielding a central processing unit in the personal computer system to a task associated with the user interaction; and yielding the central processing unit to said method.

11. The method of claim 10, wherein said step of transferring the plurality of files as a single, continuous stream of data from the source location to the destination location via the buffer in the personal computer system comprises the step of:

copying the plurality of files to the destination location.

12. The method of claim 10, wherein said step of transferring the plurality of files as a single, continuous stream of data from the source location to the destination location via the buffer in the personal computer system comprises the step of:

moving the plurality of files to the destination location.

13. The method of claim 10, wherein said step of transferring the plurality of files as a single, continuous stream of data from the source location to the destination location via the buffer in the personal computer system comprises the step of:

organizing the continuous stream of data into one or more chunks.

14. The method of claim 13 further comprising the step of:
   determining an optimal chunk size as a function of average file size, overhead and computer system throughput.

15. The method of claim 10, wherein said step of determining whether a user has interacted with the personal computer system comprises the step of:
   determining whether a status flag has been set in response to the user's interaction with the computer system.

16. The method of claim 10, wherein said step of yielding the central processing unit to said step method occurs if the task associated with the user interaction is completed.

17. The method of claim 10, wherein said step of yielding the central processing unit to said method occurs if the central processing unit is required to wait during the user initiated task.

18. An apparatus for accomplishing a cooperative file transfer operation comprising the steps of:
   means for transferring a file from a source location to a buffer;
   means for transferring the file from the buffer to a destination location;
   means for determining whether a task has been initiated by a user during the file transfer operation;
   means for suspending the file transfer operation if it is determined that a task has been initiated by a user;
   means for yielding a computer resource to accomplish the user initiated task;
   means for yielding the computer resource back to the file transfer operation; and
   means for resuming the file transfer operation.

19. The apparatus of claim 18, wherein the file transfer operation is a copy file operation.

20. The apparatus of claim 18, wherein the file transfer operation is a move file operation.

21. The apparatus of claim 18, wherein said means for transferring the file from the source location to the buffer comprises means for reading the file, wherein said means for transferring the file from the buffer to the destination location comprises means for writing the file, and wherein said means for writing the file is independent of said means for reading.

22. The apparatus of claim 21 further comprising:
   means for archiving the file in the buffer, wherein there is no temporal overlap between said means for reading and said means for writing.

23. The apparatus of claim 21, wherein said means for reading and said means for writing are executed simultaneously.

24. The apparatus of claim 18 wherein said means for determining whether a task has been initiated during the file transfer operation comprises:
   means for determining whether a status flag has been set in response to task initiation.

25. The apparatus of claim 18, wherein said means for yielding the computer resource back to the file transfer operation comprises:
   means for determining whether the user initiated task is completed.

26. The apparatus of claim 18, wherein said means for yielding the computer resource back to the file transfer operation comprises:
   means for determining whether the computer resource is required to wait during the user initiated task.

27. A personal computer system capable of cooperatively transferring a plurality of files from a source location to a destination location comprising:
   means for transferring the plurality of files as a single, continuous stream of data from the source location to the destination location via a buffer in the personal computer system;
   during said step of transferring the plurality of files, means for determining whether a user has interacted with the personal computer system;
   means for suspending said step of transferring the plurality of files, if it is determined that the user has interacted with the personal computer system;
   means for yielding a central processing unit in the personal computer system to a task associated with the user interaction; and
   means for yielding the central processing unit to said method.

28. The personal computer system of claim 27, wherein said means for transferring the plurality of files as a single, continuous stream of data from the source location to the destination location via the buffer in the personal computer system comprises:
   means for copying the plurality of files to the destination location.

29. The personal computer system of claim 27, wherein said means for transferring the plurality of files as a single, continuous stream of data from the source location to the destination location via the buffer in the personal computer system comprises:
   means for moving the plurality of files to the destination location.

30. The personal computer system of claim 27, wherein said means for transferring the plurality of files as a single, continuous stream of data from the source location to the destination location via the buffer in the personal computer system comprises:
   means for organizing the continuous stream of data into one or more chunks.

31. The personal computer system of claim 30 further comprising:
   means for determining an optimal chunk size as a function of average file size, overhead and computer system throughput.

32. The personal computer system of claim 27, wherein said means for determining whether a user has interacted with the personal computer system comprises:
   means for determining whether a status flag has been set in response to the user's interaction with the computer system.

33. The personal computer system of claim 27, wherein said means for yielding the central processing unit to said method occurs if the task associated with the user interaction is completed.

34. The personal computer system of claim 27, wherein said means for yielding the central processing unit to said method occurs if the central processing unit is required to wait during the user initiated task.

35. A computer-readable medium containing a program which performs the steps of:
   transferring a file from a source location to a buffer;
   transferring the file from the buffer to a destination location;
   determining whether a task has been initiated by a user during the file transfer operation;
   suspending the file transfer operation if it is determined that a task has been initiated by a user;
   yielding a computer resource to accomplish the task;

yielding the computer resource back to the file transfer operation; and resuming the file transfer operation.

36. The program of claim 35, wherein said step of determining whether a task has been initiated during the file transfer operation comprises the step of:

determining whether a status flag has been set in response to the task.

37. The program of claim 35, wherein said step of yielding the computer resource back to the file transfer operation comprises the step of:

determining whether the task is completed.

38. The program of claim 35, wherein said step of yielding the computer resource back to the file transfer operation comprises the step of:

determining whether the computer resource is required to wait during the task.

39. In a personal computer system, a computer-readable medium containing a program which cooperatively transfers a plurality of files from a source location to a destination location, said program performing the steps of:

transferring the plurality of files as a single, continuous stream of data from the source location to the destination location via a buffer in the personal computer system;

during said step of transferring the plurality of files, determining whether a user has interacted with the personal computer system;

suspending said step of transferring the plurality of files, if it is determined that the user has interacted with the personal computer system;

yielding a central processing unit in the personal computer system to a task associated with the user interaction; and yielding the central processing unit to said method.

40. The program of claim 39, wherein said step of transferring the plurality of files as a single, continuous stream of data from the source location to the destination location via the buffer in the personal computer system comprises the step of:

organizing the continuous stream of data into one or more chunks.

41. The program of claim 40 further performing the step of:

determining an optimal chunk size as a function of average file size, overhead and computer system throughput.

42. The program of claim 39, wherein said step of determining whether a user has interacted with the personal computer system comprises the step of:

determining whether a status flag has been set in response to the user's interaction with the computer system.

43. The program of claim 39, wherein said step of yielding the central processing unit to said step method occurs if the task associated with the user interaction is completed.

44. The program of claim 39, wherein said step of yielding the central processing unit to said method occurs if the central processing unit is required to wait during the user initiated task.

* * * * *